US006787931B2

(12) United States Patent
Nakagawa et al.

(10) Patent No.: US 6,787,931 B2
(45) Date of Patent: Sep. 7, 2004

(54) STARTER GENERATOR FOR INTERNAL COMBUSTION ENGINE

(75) Inventors: Masanori Nakagawa, Numazu (JP); Yutaka Inaba, Numazu (JP); Shuichi Muramatsu, Numazu (JP); Hideaki Suzuki, Numazu (JP)

(73) Assignee: Kokusan Denki Co., Ltd., Shizuoka-Ken (JP)

( * ) Notice: Subject to any disclaimer, the term of this patent is extended or adjusted under 35 U.S.C. 154(b) by 0 days.

(21) Appl. No.: 10/620,501

(22) Filed: Jul. 16, 2003

(65) Prior Publication Data

US 2004/0036295 A1 Feb. 26, 2004

(30) Foreign Application Priority Data

Aug. 20, 2002 (JP) ....................................... 2002-239195

(51) Int. Cl.[7] ............................... H02P 9/08; H02P 1/00

(52) U.S. Cl. ............................. 290/31; 290/32; 322/46; 310/113; 310/114

(58) Field of Search ................................ 290/30 R, 31, 290/32, 36 R, 38 R; 322/46, 24, 10, 11, 39, 45; 310/113, 114

(56) References Cited

U.S. PATENT DOCUMENTS 5,495,127 A * 2/1996 Aota et al. .................... 290/31
5,880,533 A * 3/1999 Arai et al. .................... 290/31
6,392,311 B2 * 5/2002 Inaba et al. ............... 290/38 R
6,462,429 B1 * 10/2002 Dhyanchand et al. ......... 290/31

FOREIGN PATENT DOCUMENTS

JP 01-159600 11/1989

* cited by examiner

*Primary Examiner*—Nicholas Ponomarenko
*Assistant Examiner*—Leda Pham
(74) *Attorney, Agent, or Firm*—Pearne & Gordon LLP

(57) ABSTRACT

A starter generator for an internal combustion engine including: a rotating electric machine having a magnet rotor mounted to a crankshaft of the internal combustion engine, and a stator with a three-phase first armature coil and a three-phase second armature coil; a first battery and a second battery connected in series or in parallel; a first driver circuit provided between the first armature coil and the first battery, and a second driver circuit provided between the second armature coil and the second battery; and an inverter that converts voltages of the first battery and the second battery into an AC voltage, wherein drive currents are supplied to the first armature coil and the second armature coil from the first battery and the second battery through switch circuits in the first driver and the second driver, when the engine is started, and induced voltages of the first armature coil and the second armature coil are supplied to the batteries through rectifier circuits in the first driver and the second driver to charge the batteries, after the engine is started.

4 Claims, 6 Drawing Sheets

| X | Y | OUTPUT VOLTAGE | SERIES-PARALLEL TRANSFER SWITCH |
|---|---|---|---|
| 0 | 0 | 100V | OFF |
| 0 | 1 | 120V | OFF |
| 1 | 0 | 230V | ON |
| 1 | 1 | 240V | ON |

STARTER GENERATOR FOR INTERNAL COMBUSTION ENGINE

TECHNICAL FIELD OF THE INVENTION

The present invention relates to a starter generator for an internal combustion engine that operates as an electric motor for starting the internal combustion engine when the internal combustion engine is started, and operates as a generator after the internal combustion engine is started.

BACKGROUND OF THE INVENTION

A starter generator for an internal combustion engine is comprised of a rotating electric machine that includes a magnet rotor mounted to a crankshaft of the engine, and a stator having a polyphase armature coil wound around an armature core, and a driver provided between the armature coil of the rotating electric machine and a battery.

The driver is comprised of a bridge type switch circuit that performs a function of transferring phases where a drive current is flowed so as to rotate the rotor in a predetermined direction, and a rectifier circuit that rectifies an AC voltage induced in the armature coil to supply the AC voltage to the battery after the engine is started.

Generally, a bridge type full-wave rectifier circuit in which a diode forms each side of a bridge is used as a rectifier circuit. The switch circuit is constituted by a switch element connected in anti-parallel to each diode of the rectifier circuit.

As a power supply unit that uses a generator driven by the internal combustion engine to supply power at a commercial frequency to a load, a power supply unit is often used, that includes an AC/DC converter that converts an AC voltage output by the generator into a DC voltage, and an inverter that converts an output of the converter into an AC voltage. Such a power supply unit is known as an inverter generator.

When the starter generator as described above is used, the inverter generator can be comprised by adding an inverter that converts a voltage of the battery into an AC voltage, to an output side of the battery that is charged with an induced voltage of the armature coil through the rectifier circuit in the driver.

The inverter generator is used instead of a commercial power supply, and thus a rated output voltage of the inverter generator differs depending on countries. There are five types of rated voltages of commercial power supplies now used across the world: 100 V, 110 V, 120 V, 230 V, and 240 V (all of them are effective values). These voltages can be divided into a 100 V system (100 V, 110 V, 120 V) and a 200 V system (230 V and 240 V).

In a conventional inverter generator, two types of generators having winding specifications suitable, one for obtaining a rated voltage of the 100 V system, and the other for obtaining a rated voltage of the 200 V system, are prepared to obtain the voltage for each system. Specifically, for the 100 V system voltage, a generator is prepared, having winding specifications that allow generation of an AC voltage with a peak value (approximately 170 V) required for obtaining an AC voltage of 120 V in a maximum rated voltage (an effective value) in the system, and an output of the generator is once converted into a DC output, then the DC output is input to an inverter, and the inverter is controlled to generate the AC voltage of 100 V, 110 V, or 120 V, when the internal combustion engine is in a normal operation state.

For the 200 V system voltage, a generator is prepared, having winding specifications that allow generation of an AC voltage with a peak value (approximately 339 V) required for obtaining an AC voltage of 240 V in an effective value, and an output of the generator is once converted into a DC output, then the DC output is input to an inverter, and the inverter is controlled to generate the AC voltage of 230 V, or 240 V, when the internal combustion engine is in a normal operation state.

However, when using the generators having different winding specifications for the different voltage systems as described above, the two types of generators have to be prepared, thus inevitably increasing costs.

It can be considered that a generator having the same winding specifications is used to obtain both the 100 V system rated voltage and the 200 V system rated voltage by controlling the inverter, but such a construction requires a generator having a maximum output larger than a rated output of the inverter, thus increasing sizes of an armature core and an armature coil to increase sizes of a rotating electric machine.

In the inverter generator, it is preferable to use a generator having a maximum output suitable for a rated output of an inverter in order to prevent increase in a size of the generator more than necessary.

SUMMARY OF THE INVENTION

Therefore, an object of the invention is to provide a starter generator for an internal combustion engine that are adapted to obtain a 100 V system voltage and a 200 V system voltage, without increasing sizes of a rotating electric machine more than necessary.

The present invention is applied to a starter generator for an internal combustion engine that operates as an electric motor for starting the internal combustion engine when the internal combustion engine is started, and operates as a generator after the internal combustion engine is started.

According to the invention, the starter generator for an internal combustion engine includes: a magnet rotor mounted to a crankshaft of the internal combustion engine; a stator having a polyphase first armature coil and a polyphase second armature coil; a first battery and a second battery; a first driver provided between the first armature coil and the first battery, and a second driver provided between the second armature coil and the second battery; an inverter that converts a voltage of the first battery and a voltage of the second battery to an AC voltage; and a controller that controls the first driver, the second driver, and the inverter.

Each driver includes: a polyphase rectifier circuit that is constituted by a bridge circuit of diodes, and rectifies an AC voltage induced in the corresponding armature coil to supply the AC voltage to the corresponding battery; and a polyphase switch circuit that is constituted by a bridge circuit of switch elements, each switch element being connected in anti-parallel to the corresponding diode that forms the polyphase rectifier circuit.

The controller includes: a driver control unit that flows drive currents through the first armature coil and the second armature coil from the first battery and the second battery through the polyphase switch circuits in the first driver and the second driver, respectively, so as to rotate the magnet rotor in a direction of starting the internal combustion engine, when the internal combustion engine is started, and controls the polyphase switch circuits in the first driver and the second driver, so as to keep, at a value equal to or less than a set value, DC voltages supplied to the first battery and the second battery from the first armature coil and the second armature coil through the polyphase rectifier circuits in the first driver and the second driver, after the internal combustion engine is started; and an inverter control unit that controls the inverter so as to output an AC voltage at a desired frequency from the inverter.

The first battery and the second battery are connected in series or in parallel according to an effective value of the AC voltage output from the inverter and are connected between DC input terminals of the inverter.

With the construction as described above, the drive currents can be flowed through the first armature coil and the second armature coil from the first battery and the second battery through the switch circuits in the first driver circuit and the second driver circuit to drive the magnet rotor in the direction of starting the engine, when the internal combustion engine is started.

After the internal combustion engine is started, charging currents can be supplied to the first battery and the second battery from the first armature coil and the second armature coil through the rectifier circuits in the first driver and the second driver to charge the batteries, and output voltages of the batteries can be converted by the inverter into an AC voltage at a commercial frequency and supplied to a load.

As described above, the first battery and the second battery, connected in series or in parallel according to the effective value of the AC voltage output from the inverter, are connected between the input terminals of the inverter. Thus, the generator having a maximum output equal to a rated output of the inverter can be used to generate a 100 V system voltage and a 200 V system voltage. Therefore, a starter generator that can generate the 100 V system voltage and the 200 V system voltage can be obtained without increasing sizes of an armature core and the armature coils more than necessary.

In a preferable aspect of the invention, there are further provided a first diode having a cathode and an anode connected to a positive terminal of the first battery and a positive terminal of the second battery, respectively, and a second diode having a cathode and an anode connected to a negative terminal of the first battery and a negative terminal of the second battery, respectively, and the positive terminal of the first battery and the negative terminal of the second battery are connected to a positive DC input terminal and a negative DC input terminal, respectively, of the inverter.

With such a construction, the negative terminal of the first battery and the positive terminal of the second battery are connected or disconnected to transfer between a state where the first battery and the second battery are connected in series and a state where the both batteries are connected in parallel.

When the first diode and the second diode are provided as described above, it is preferable to connect a series-parallel transfer switch between the negative terminal of the first battery and the positive terminal of the second battery. With the series-parallel transfer switch, the transfer switch is turned on to connect the first battery and the second battery in series, and the transfer switch is turned off to connect the batteries in parallel.

BRIEF DESCRIPTION OF THE DRAWINGS

The above and other objects and features of the invention will be apparent from the detailed description of the preferred embodiments of the invention, which is described and illustrated with reference to the accompanying drawings, in which.

DETAILED DESCRIPTION OF THE PREFERRED EMBODIMENTS

Figure 1:
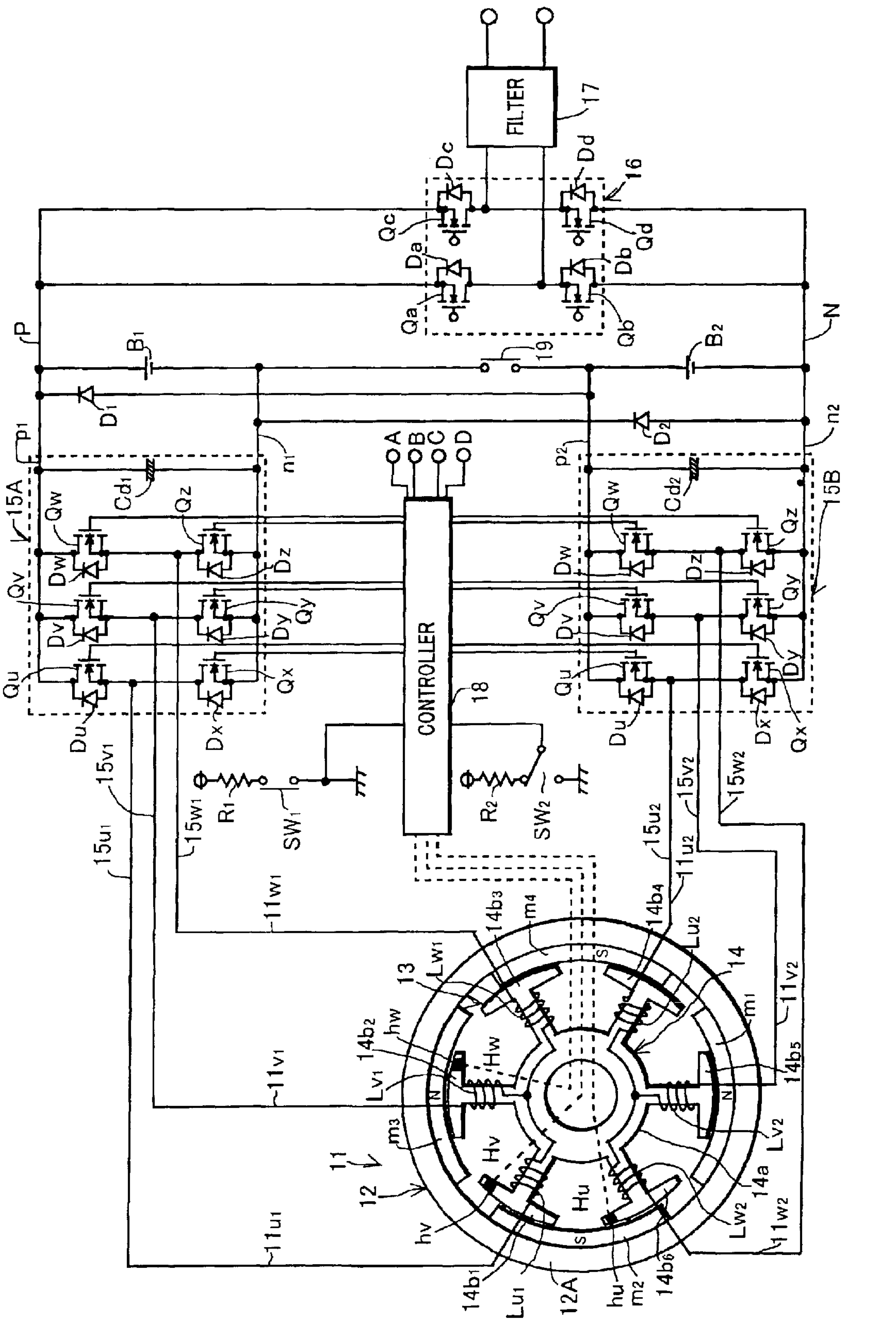
FIG. 1 is a schematic circuit diagram of a construction of an embodiment of the invention.

Now, embodiments of the invention will be described with reference to the drawings. FIG. 1 shows a construction according to an embodiment of the invention. In FIG. 1, a reference numeral 11 denotes a rotating electric machine mounted to an internal combustion engine, which includes a magnet rotor 12 mounted to a crankshaft of the engine, and a stator (an armature) 13 secured to a case or the like of the engine. The shown magnet rotor 12 is comprised of a cup-like rotor yoke 12A mounted to the crankshaft of the engine, and four permanent magnets m1 to m4 mounted at 90° intervals to an inner periphery of the rotor yoke, and the magnets m1 to m4 constitute a four-pole magnet field.

The stator 13 includes a six-pole armature core 14, and a first armature coil which is constituted by phase coils Lu1 to Lw1 and a second armature coil which is constituted by phase coils Lu2 to Lw2 wound around the armature core 14.

The armature core 14 includes an annular yoke 14*a*, and six salient poles 14*b*1 to 14*b*6 radially protruding from an outer periphery of the yoke, and six magnetic pole portions are formed on tips of the salient poles 14*b*1 to 14*b*6, respectively. The six magnetic pole portions face magnetic poles of the magnet rotor 12 with predetermined gaps therebetween.

The three-phase first armature coil Lu1 to Lw1 is wound around the three salient poles 14*b*1 to 14*b*3 of the armature core 14 with the same number of turns. The second armature coil Lu2 to Lw2 is wound around the salient poles 14*b*4 to 14*b*6, provided 180° away from the salient poles 14*b*1 to 14*b*3, with the same number of turns.

The first armature coil and the second armature coil are wound to have the same coil specifications, and the number of turns of each armature coil is determined so as to induce a voltage with a peak value of at least 170 V in each armature coil when the internal combustion engine is in a normal operation state.

The first armature coil Lu1 to Lw1 and the second armature coil Lu2 to Lw2 are star-connected. Three-phase terminals 11*u*1 to 11*w*1 are drawn from ends opposite from a neutral point of the first armature coil Lu1 to Lw1, and three-phase terminals 11*u*2 to 11*w*2 are drawn from ends opposite from a neutral point of the second armature coil Lu2 to Lw2.

Positional sensors hu, hv, and hw that detect a rotation angle position of the magnet rotor 12 with respect to the armature coil in a U-phase, a V-phase, and a W-phase are mounted to the stator 13 in order to operate the rotating electric machine 11 as a brushless DC electric motor to rotatably drive the crankshaft when the engine is started. The positional sensors hu to hw include a Hall IC, and detect a polarity of the magnetic pole of the magnet rotor 12 in positions corresponding to predetermined areas of the magnetic pole portions at the tips of the salient poles 14*b*6, 14*b*1, and 14*b*2 around which the armature coil in the W-phase, the U-phase, and the V-phase is wound. The positional sensors hu to hw output rectangular waveform position detection signals Hu to Hw having different levels between when the positional sensors hu to hw detect the N magnetic pole and when the positional sensors hu to hw detect the S magnetic pole.

In the embodiment in FIG. 1, the magnet rotor 12 rotates clockwise in FIG. 1 when the internal combustion engine rotates in a forward direction.

In the invention, a first driver 15A and a second driver 15B are provided with respect to the first armature coil Lu1 to Lw1 and the second armature coil Lu2 to Lw2, respectively, in order to flow drive currents through the first armature coil and the second armature coil when the internal combustion engine is started, and to rectify AC voltages output by the first armature coil and the second armature coil after the internal combustion engine is started.

The first driver 15A includes a three-phase diode bridge full-wave rectifier circuit constituted by diodes Du to Dw that form an upper side of a bridge and diodes Dx to Dz that form a lower side of the bridge, and a bridge type switch circuit constituted by switch elements Qu to Qw and Qx to Qz connected in anti-parallel to and bridge-connected to the diodes Du to Dw and Dx to Dz of the rectifier circuit. A first power supply capacitor Cd1 is connected between DC terminals p1 and n1, which are drawn in common from the rectifier circuit and the switch circuit.

The three-phase terminals 11*u*1 to 11*w*1 of the first armature coil are connected to a three-phase AC terminal 15*u*1 to 15*w*1 drawn in common from the rectifier circuit and the switch circuit in the first driver 15A, and a positive terminal and a negative terminal of a first battery B1 are connected to the positive DC terminal p1 and the negative DC terminal n1 of the driver, respectively.

A second driver 15B is comprised completely the same as the first driver, and a second power supply capacitor Cd2 is connected between the DC terminals p2 and n2. The three-phase terminals 11*u*2 to 11*w*2 of the second armature coil Lu2 to Lw2 are connected to three-phase AC terminals 15*u*2 to 15*w*2 of the second driver 15B, and a positive terminal and a negative terminal of a second battery B2 are connected to a positive DC terminal p2 and a negative DC terminal n2 of the driver 15B.

Further, a cathode and an anode of a first diode D1 are connected to the positive terminal of the first battery B1 and the positive terminal of the second battery B2, respectively, and a cathode and an anode of a second diode D2 are connected to the negative terminal of the first battery B1 and the negative terminal of the second battery B2, respectively.

A series-parallel transfer switch 19 that includes a relay contact or the like and can be controlled on/off is connected between the negative terminal of the first battery B1 and the positive terminal of the second battery B2. When the series-parallel transfer switch 19 is closed, the first battery B1 and the second battery B2 are connected in series, and when the series-parallel transfer switch 19 is opened, the batteries are connected in parallel via the diodes D1 and D2.

A positive DC input terminal P and a negative DC input terminal N of an inverter 16 are connected to the positive terminal of the first battery B1 and the negative terminal of the second battery B2, respectively; and depending on on/of of the series-parallel transfer switch 19, a voltage across the batteries B1, B2 connected in series (a sum of the voltages of the two batteries), or an output voltage of each of the batteries B1, B2 connected in parallel is applied between the DC input terminals P, N of the inverter 16.

In the embodiment, the first battery B1 and the second battery B2 are connected in parallel when a 100 V system voltage is output from the inverter 16, and the first battery B1 and the second battery B2 are connected in series when a 200 V system voltage is output from the inverter 16.

The inverter 16 is a bridge type inverter including a bridge circuit of switch elements Qa to Qd, and diodes Da to Dd connected in anti-parallel to the switch elements. The inverter is controlled by a controller described later to alternately create a period when the switch elements Qa, Qd in diagonal positions of the bridge are ON, and a period when the switch elements Qb, Qc in another diagonal positions are ON, thereby converting DC voltages provided from the batteries B1, B2 into an AC voltage.

An AC voltage obtained between AC output terminals 16*u*, 16*v* of the inverter 16 is provided to an unshown load through a filter 17 that removes harmonic contents from the AC voltage.

In this embodiment, MOSFETs are used as the switch elements Qu to Qw and Qx to Qz that constitute the switch circuit in each driver. When the MOSFETs are used as the switch elements, parasitic diodes formed between drain and source of the MOSFET can be used as the diodes Du to Dw and Dx to Dz that constitute the rectifier circuit. Likewise, the MOSFETs are thus used as the switch elements Qa to Qd that constitute the inverter 16. When the MOSFETs are used as the switch elements Qa to Qd, the parasitic diodes formed between drain and source of the MOSFET can be used as the diodes Da to Dd.

A controller 18 having a microprocessor is provided in order to control the first driver 15A, the second driver 15B, and the inverter 16. To the controller 18, the outputs of the positional sensors hu to hw that detect the rotation angle position of the magnet rotor 12, a start instruction signal provided from a start switch SW1 to which a DC voltage is applied from an unshown DC power supply through a resistance R1, and a voltage transfer instruction signal provided from a voltage transfer instruction switch SW2 to which an output voltage of the unshown DC power supply is applied through a resistance R2 are input.

The controller 18 includes: a driver control unit that flows currents to the first armature coil Lu1 to Lw1 and the second armature coil Lu2 to Lw2 from the first battery B1 and the second battery B2 through the switch circuits in the first driver 15A and the second driver 15B, respectively, so as to rotate the magnet rotor 12 in a direction of starting the internal combustion engine, when the internal combustion engine is started, and controls the switch circuits in the first driver 15A and the second driver 15B, so as to keep, at a value equal to or less than a set value, DC voltages supplied to the first battery B1 and the second battery B2 from the first armature coil and the second armature coil through the rectifier circuits in the first driver 15A and the second driver 15B, after the internal combustion engine is started; and an inverter control unit that controls the inverter 16 so as to output an AC voltage at a commercial frequency from the inverter.

Figure 2:
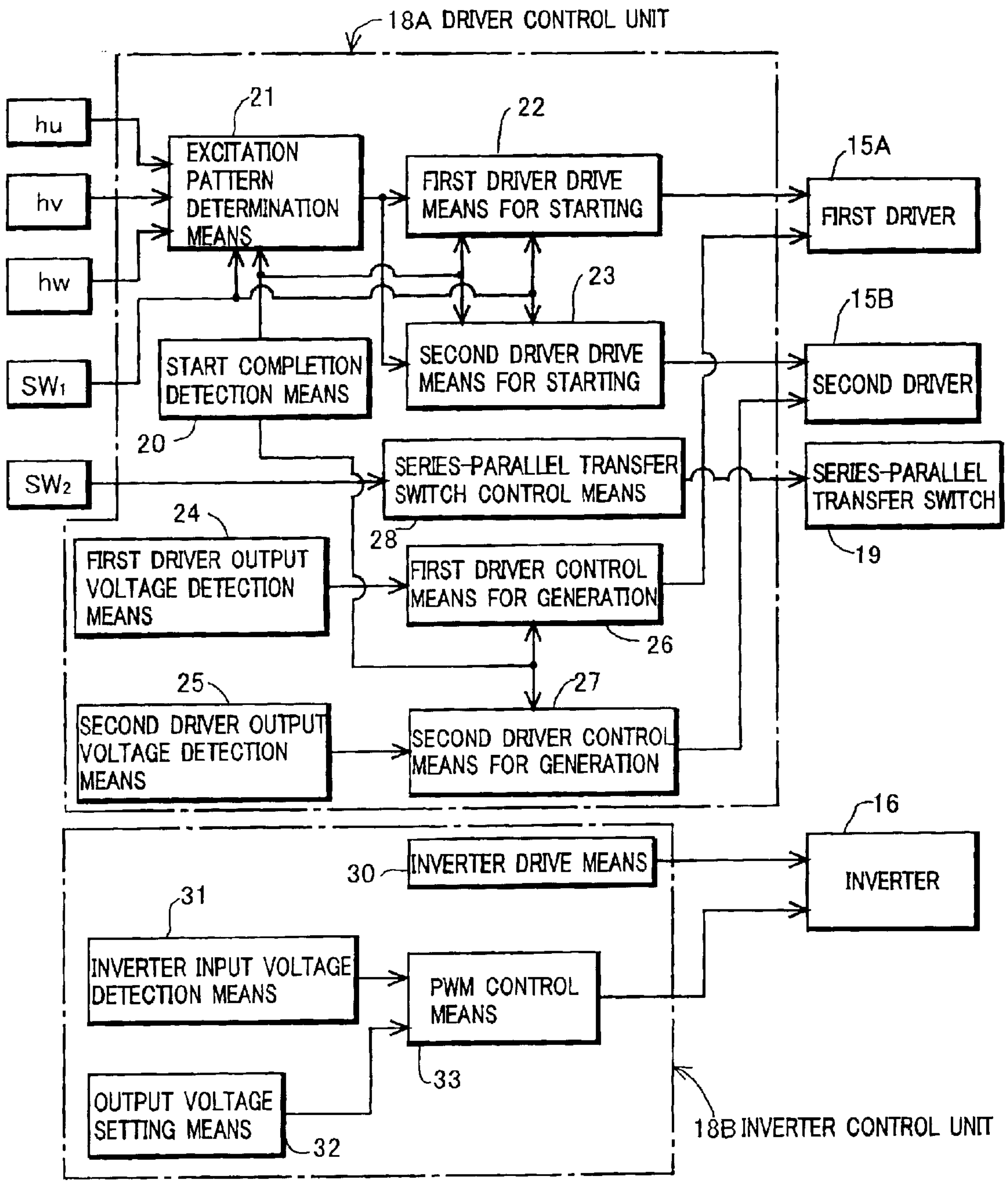
FIG. 2 is a block diagram of an example of a construction of a controller used in the embodiment of FIG. 1.

The driver control unit and the inverter control unit are comprised of means for achieving various functions that are achieved by causing the microprocessor in the controller 18 to execute a predetermined program. FIG. 2 shows an example of means for achieving functions comprised by the microprocessor.

In FIG. 2, a reference numeral 18A denotes the driver control unit, and 18B denotes the inverter control unit. The shown driver control unit 18A includes: start completion detection means 20 for completing a start of the internal combustion engine; excitation pattern determination means 21 for determining, from the outputs of the positional sensors hu to hw, an excitation pattern that indicates a phase where an armature current is flowed (an excitation phase) and a phase where the armature current is not flowed (a non-excitation phase) in order to rotate the magnet rotor 12 in the direction of starting the internal combustion engine, when the start instruction switch SW1 provides a start instruction, and the start completion detection means 20 does not detect that the start of the engine has been completed; first driver drive means for starting 22 and second driver drive means for starting 23 for providing a drive signal (a signal for turning on a switch element) to a predetermined switch element of the first driver 15A and the second driver 15B so as to flow an armature current through an armature coil in the excitation phase determined by the excitation pattern determination means 21, when the start instruction switch SW1 provides a start instruction, and the start completion detection means 20 does not detect that the start of the engine has been completed; first driver output voltage detection means 24 and second driver output voltage detection means 25 for detecting an output voltage of the first driver 15A (a voltage across the capacitor Cd1) and an output voltage of the second driver 15B (a voltage across the capacitor Cd2) when the start completion detection means 20 detects that the start of the engine is completed; first driver control means for generation 26 for controlling the switch circuit in the first driver 15A so as to keep, at a set value, the voltage detected by the first driver output voltage detection means 24, when the start completion detection means 20 detects that the start of the engine is completed; second driver control means for generation 27 for controlling the switch circuit in the second driver 15B, so as to keep, at a set value (in this embodiment, approximately 170 V), the voltage detected by the second driver output voltage detection means 25, when the start completion detection means 20 detects that the start of the engine is completed; and series-parallel transfer switch control means 28 for controlling the series-parallel transfer switch 19 according to the voltage transfer instruction provided by the voltage transfer switch SW2.

The inverter control unit 18B includes: inverter drive means 30 for supplying drive signals A to D to the switch elements Qa to Qd that constitute the inverter 16 so as to output the AC voltage at the commercial frequency from the inverter 16; inverter input voltage detection means 31 for detecting the DC voltage input to the inverter 16; output voltage setting means 32 for setting an effective value (any of 100 V, 110 V, 120 V, 230 V, and 240 V) of the output voltage of the inverter as a set voltage; and PWM control means 33 for arithmetically operating a duty ratio of on/off of the switch elements required for performing PWM control of the switch elements of the inverter 16 to match the output voltage of the inverter to the set voltage, from the DC voltage input to the inverter 16 and the voltage set by the output voltage setting means 32, and performing PWM modulation of the drive signals A, C or B, D provided to the switch elements so as to turn on/off the switch elements of the inverter 16 in the arithmetically operated duty ratio.

According to the starter generator for the internal combustion engine of the embodiment, when the start instruction switch SW1 provides a start instruction to the controller 18, the excitation pattern determination means 21 determines the excitation phase and the non-excitation phase according to the outputs of the positional sensors hu to hw. At this time, the first driver drive means for starting 22 and the second driver drive means for starting 23 control the switch circuits in the drivers 15A, 15B so as to flow the armature currents through the first armature coil and the second armature coil in the excitation phase from the first battery B1 and the second battery B2, thus rotating the magnet rotor 12 in the starting direction of the engine to start the engine.

When the start completion detection means 20 detects the completion of the start of the engine, the first driver drive means for starting 22 and the second driver drive means for starting 23 stop their operations, and thus all the switch elements of the first driver 15A and second driver 15B are turned off to stop the supply of the armature currents to the first armature coil and the second armature coil.

When the start of the internal combustion engine is completed, the rotating electric machine 1 enters a state of being driven by the engine. Thus, three-phase AC voltages are induced in the first armature coil Lu1 to Lw1 and the second armature coil Lu2 to Lw2, and the voltages are applied to the first battery B1 and the second battery B2 through the rectifier circuits in the first driver 15A and the second driver 15B. This charges the batteries. When the output voltages of the armature coils increase to cause the voltage across the first battery B1 and the voltage across the second battery B2 to exceed the set value (170 V), the switch circuits in the first driver 15A and the second driver 15B are controlled so that the first driver control means for generation 26 and the second driver control means for generation 27 reduce the voltages applied to the first battery B1 and the second battery B2 to less than the set value. This control is performed, for example, by turning on at the same time the switch elements Qu to Qw that form the upper side of the bridge of the switch circuit in each driver, or turning on at the same time the switch elements Qx to Qz that form the lower side of the bridge, when the voltage across each battery exceeds the set value, to form a circuit that shorts the output of the armature coil in each driver.

Thus, while the internal combustion engine is driven, the voltages supplied to the first battery and the second battery from the first armature coil and the second armature coil through the rectifier circuits in the first driver and the second driver are kept at a value equal to or less than the set value, and the voltages across the batteries B1, B2 are kept at the set value (in this embodiment, 170 V).

When the voltage transfer instruction switch SW2 instructs to select the 100 V system voltage as the output voltage of the inverter, the series-parallel transfer switch control means 28 turns off the series-parallel transfer switch 19 to connect the first battery B1 and the second battery B2 in parallel. In this state, the terminal voltage (170 V) of the first battery B1 and the second battery B2 is input to the inverter 16. At this time, the PWM control means 33 performs the PWM control of the switch elements of the inverter in a predetermined duty ratio so as to match the output voltage of the inverter to the voltage set by the output voltage setting means 32 (100 V, 110 V, or 120 V), and causes the inverter 16 to output an AC voltage equal to the set voltage (the effective value) and at the commercial frequency.

When the voltage transfer instruction switch SW2 instructs to select the 200 V system voltage as the output voltage of the inverter, the series-parallel transfer switch control means 28 turns on the series-parallel transfer switch 19 to connect the first battery B1 and the second battery B2 in series. In this state, a voltage two times larger than the terminal voltage of the first battery B1 and the second battery B2 (approximately 340 V) is input to the inverter 16. At this time, the PWM control means 33 performs the PWM control of the switch elements of the inverter in a predetermined duty ratio so as to match the output voltage of the inverter to the voltage set by the output voltage setting means 32 (230 V or 240 V), and causes the inverter 16 to output an AC voltage equal to the set voltage and at the commercial frequency.

As described above, according to the starter generator of the invention, the stator has the polyphase first armature coil Lu1 to Lw1 and the polyphase second armature coil Lu2 to Lw2, and the first driver 15A and the second driver 15B for the first armature coil and the second armature coil, respectively, the first battery B1 and the second battery B2 are charged with the induced voltages in the first armature coil and the second armature coil through the rectifier circuits in the first driver and the second driver, and the voltages obtained by connecting the batteries in series or in parallel are input to the inverter 16 and converted into the AC voltage. With such a construction, the maximum output required for the armature coil may be equal to the rated output of the inverter in both the case where the 100 V system voltage is output and the case where the 200 V system voltage is output. Thus, the starter generator that can generate the 100 V system voltage and the 200 V system voltage can be obtained without increasing the sizes of the armature core 14, and the armature coils Lu1 to Lw1 and Lu2 to Lw2 more than necessary.

Figure 7:
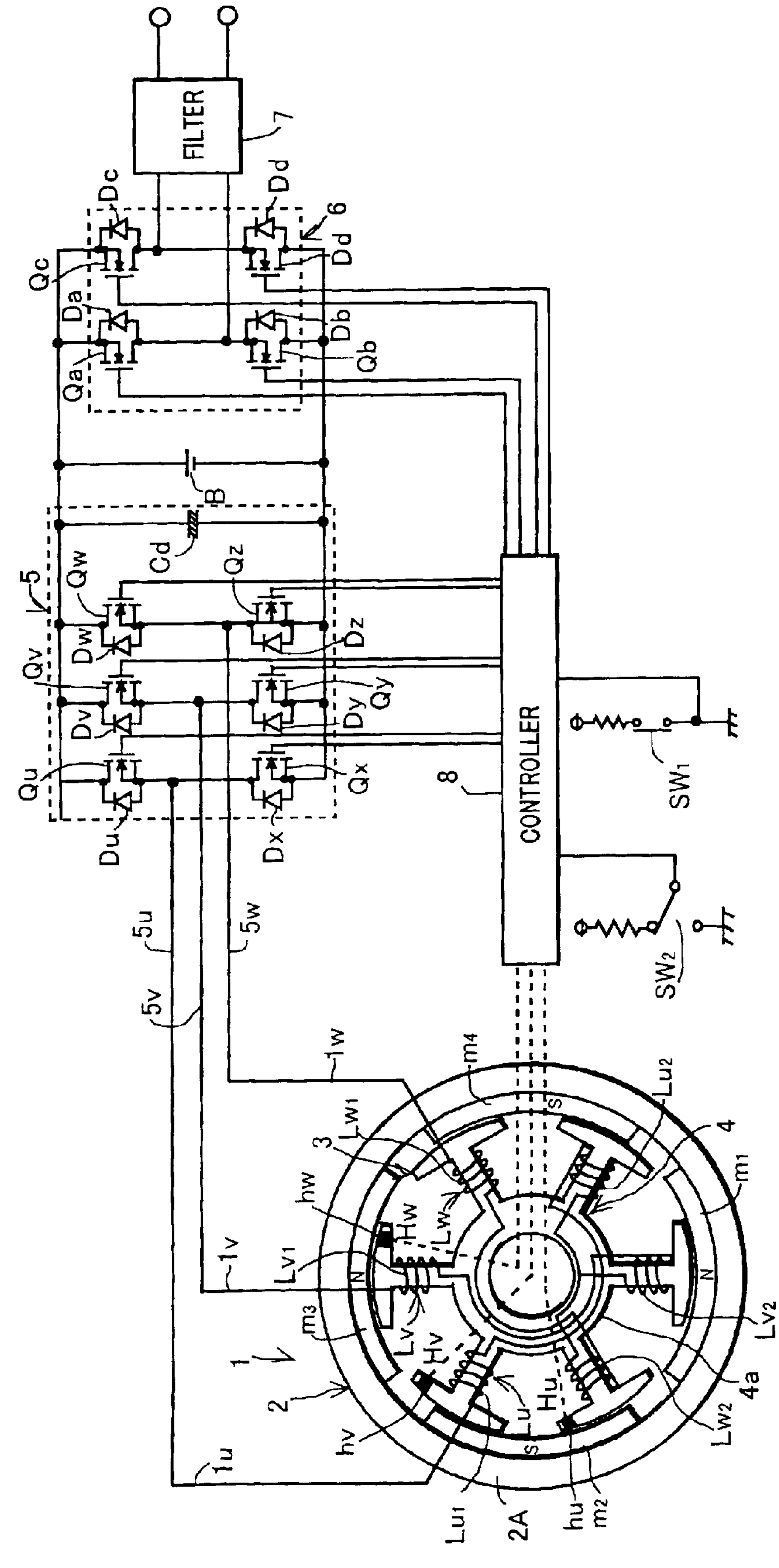
FIG. 7 is a schematic circuit diagram of a construction of a starter generator in which, when the starter generator is operated as a generator, an output of one battery charged with an output of the generator through a rectifier circuit is converted into an AC voltage by an inverter, and a 100 V system voltage and a 200 V system voltage are output from the inverter.

As a comparative example to the starter generator according to the invention, FIG. 7 shows a construction example of a starter generator for an internal combustion engine that is comprised so that one polyphase armature coil included in a stator is connected to a battery via a driver to convert a voltage of the battery into an AC voltage by an inverter, thereby obtaining both a 100 V system rated voltage and a 200 V system rated voltage by a generator with the same winding specifications.

In FIG. 7, a reference numeral 1 denotes a rotating electric machine mounted to an internal combustion engine, which includes a magnet rotor 2 mounted to a crankshaft of the engine, and a stator (an armature) 3 secured to a case or the like of the engine. The shown magnet rotor 2 is comprised of a cup-like rotor yoke 2A mounted to the crankshaft of the engine, and four permanent magnets m1 to m4 mounted to an inner periphery of the rotor yoke so as to have four poles. The stator 3 includes an armature core 4 having magnetic pole portions that face magnetic poles of the magnet rotor 2, and a three-phase armature coil which is constituted by phase coils Lu to Lw wound around the armature core 4. In the example in FIG. 7, coils Lu1, Lu2 to Lw1, Lw2 wound 180° in a mechanical angle away from each other and connected in series constitute the phase coils Lu to Lw in a U phase to a W phase, respectively. The phase coils Lu to Lw are star-connected, and three-phase terminals 1*u* to 1*w* are drawn from an end opposite from a neutral point of the coils Lu to Lw. Positional sensors hu, hv, hw that detect a rotation angle position of the magnet rotor 2 with respect to the coils in the U-phase, the V-phase, and the W-phase are mounted to the stator 3 in order to operate the rotating electric machine 1 as a starting motor when the engine is started.

In FIG. 7, a reference numeral 5 denotes a driver, which includes: a diode bridge full-wave rectifier circuit constituted by diodes Du to Dw and Dx to Dz; a bridge type switch circuit constituted by switch elements Qu to Qw and Qx to Qz connected in anti-parallel to the diodes of the rectifier circuit; and a capacitor Cd connected between DC output terminals of the rectifier circuit. The three-phase terminals 1*u* to 1*w* of the armature coil are connected to three-phase AC terminals 5*u* to 5*w* of the driver 5, respectively, and a battery B is connected between DC terminals of the driver. An output voltage of the battery B is input to a bridge type inverter 6 having a bridge circuit of switch elements Qa to Qd, and diodes Da to Dd connected in anti-parallel to the switch elements Qa to Qd, and an AC power at a commercial frequency is applied to an unshown load from the inverter 6 through a filter 7.

A reference numeral 8 denotes a controller that controls the driver 5 and the inverter 6, and to the controller 8, outputs of the positional sensors hu to hw that detect the rotation angle position of the magnet rotor, a start instruction signal provided from a start switch SW1 that instructs to start the internal combustion engine, and a voltage transfer instruction signal provided from a voltage transfer instruction switch SW2 that instructs to transfer a rated voltage to 120 V or 240 V are input.

The controller 8 flows a current to the phase coils Lu to Lw from the battery B through the switch circuit in the driver 5, so as to rotate the magnet rotor in a direction of starting the crankshaft, when the internal combustion engine is started, and controls the switch circuit in the driver 5, so as to keep, at a value equal to or less than a set value, a DC voltage supplied to the battery B from the phase coils Lu to Lw through the rectifier circuit in the driver 5, after the internal combustion engine is started. The controller also performs PWM control of the switch elements that constitute the inverter 6 so as to cause the inverter 6 to output an AC voltage at a commercial frequency instructed by the voltage transfer instruction switch SW2.

Figure 8:
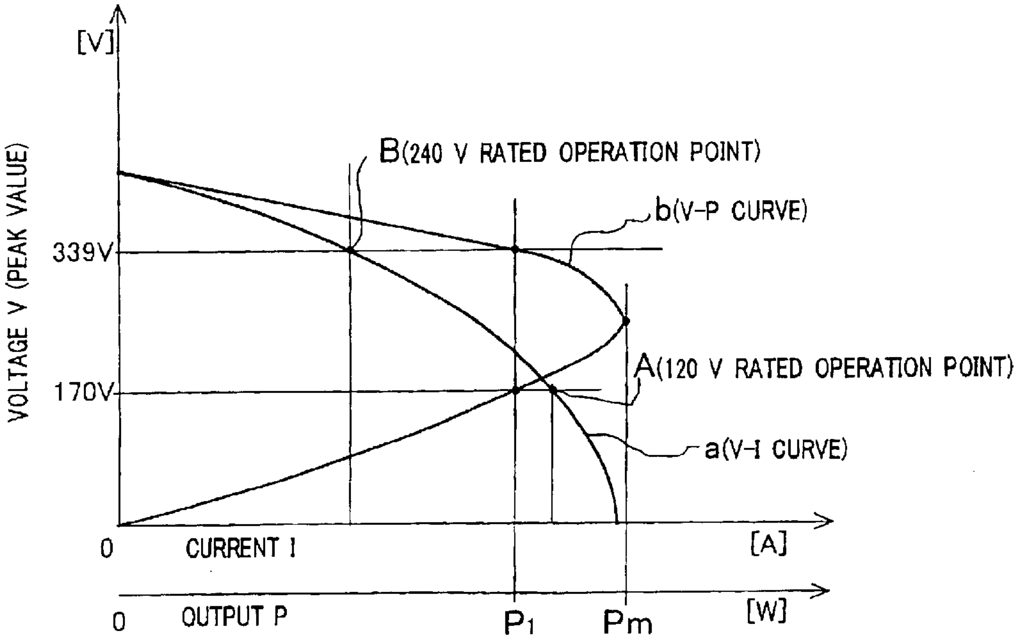
FIG. 8 is a graph showing a feature of an output voltage to an output current, and a feature of an output voltage to an output when the starter generator in FIG. 7 is operated as the generator to cause the inverter to output the 100 V system voltage and the 200 V system voltage.

FIG. 8 shows a feature of an output voltage V to an output current I, and a feature of an output voltage V to an output power P, when the starter generator in FIG. 7 is operated as a generator to obtain an output of 120 V and an output of 240 V. In FIG. 8, a curve a shows the feature of the output voltage V to the output current I, and a curve b shows the feature of the output voltage V to the output power P. Voltages of 170 V and 339 V shown on the longitudinal axis in FIG. 7 are peak values (=effective values×$\sqrt{2}$) of output voltages of the generator, required for causing the inverter 6 to output the output voltages of 120 V and 240 V in effective values of rates voltages, and operation points when a rated output current is flowed at the rated output voltage of 120 V and when a rated output current is flowed at the rated output voltage of 240 V are a point A and a point B. A reference numeral P1 denotes rated outputs of the inverter when the rated voltage is 120 V and 240 V, and Pm denotes a maximum output of the generator. When the inverter is used to obtain both the 100 V system rated voltage and the 200 V system rated voltage by the generator with the same winding specifications, the maximum output Pm of the generator requires to be larger than the rated output P1 of the inverter, as shown.

Figure 6:
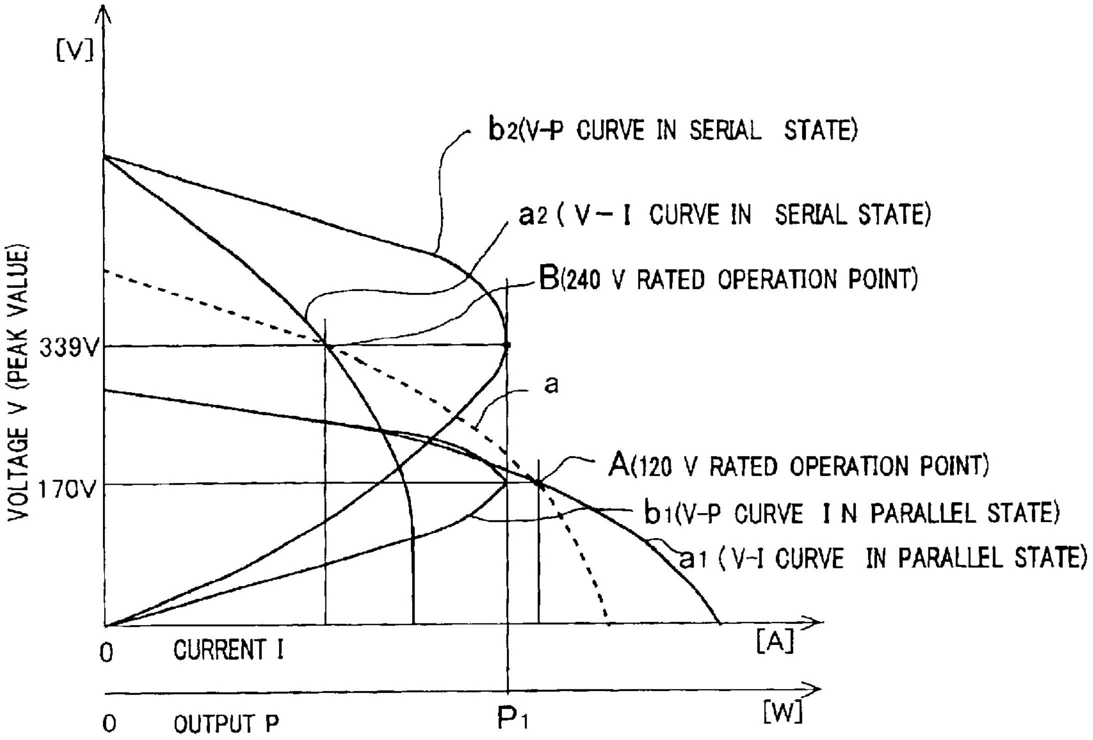
FIG. 6 is a graph showing a feature of an output voltage to an output current, and a feature of an output voltage to an output when a starter generator according to the invention is operated as a generator.

On the other hand, FIG. 6 shows a feature of an output voltage V to an output current I, and a feature of an output voltage V to an output power P when the starter generator according to the invention shown in FIG. 1 operates as the generator. In FIG. 6, a curve a1 shows the feature of the output voltage V to the output current I when the batteries B1, B2 are connected in parallel for operation, and a curve a2 shows the feature of the output voltage V to the output current I when the batteries B1, B2 are connected in series for operation. A curve b1 shows the feature of the output voltage V to the output P when the batteries B1, B2 are connected in parallel for operation, and a curve b2 shows the feature of the output voltage V to the output P when the batteries B1, B2 are connected in series for operation. A dashed curve a shows the feature of the output voltage V to the output current I as the same as the curve a in FIG. 8.

In FIG. 6, a point A is an operation point when the rated AC output P1 with the rated voltage of 120 V is obtained from the inverter, and a point B is an operation point when the rated AC output with the rated voltage of 240 V is obtained from the inverter.

According to the invention, the stator has the first armature coil and the second armature coil, and the first battery and the second battery charged with rectified outputs of the armature coils, and the first battery and the second battery, connected in series or in parallel according to the effective value of the AC voltage output from the inverter 16, are connected between the input terminals of the inverter 16. Thus, as shown in FIG. 6, the maximum output required for the armature coil may be equal to the rated output P1 in both the case where the 100 V system voltage is output and the case where the 200 V system voltage is output. Therefore, the starter generator that can generate the 100 V system voltage and the 200 V system voltage can be obtained without increasing the sizes of the armature core 14, and the armature coils Lu1 to Lw1 and Lu2 to Lw2 more than necessary.

In the above described embodiment, the output of the voltage of 120 V and the output of the voltage of 240 V are generated from the inverter, but a combination of voltages generated from the inverter is not limited to this. For example, the voltages generated from the inverter may be 120 V and 230 V, or all the voltages of 100 V, 110 V, 120 V, 230 V, and 240 V may be generated.

Figure 3:
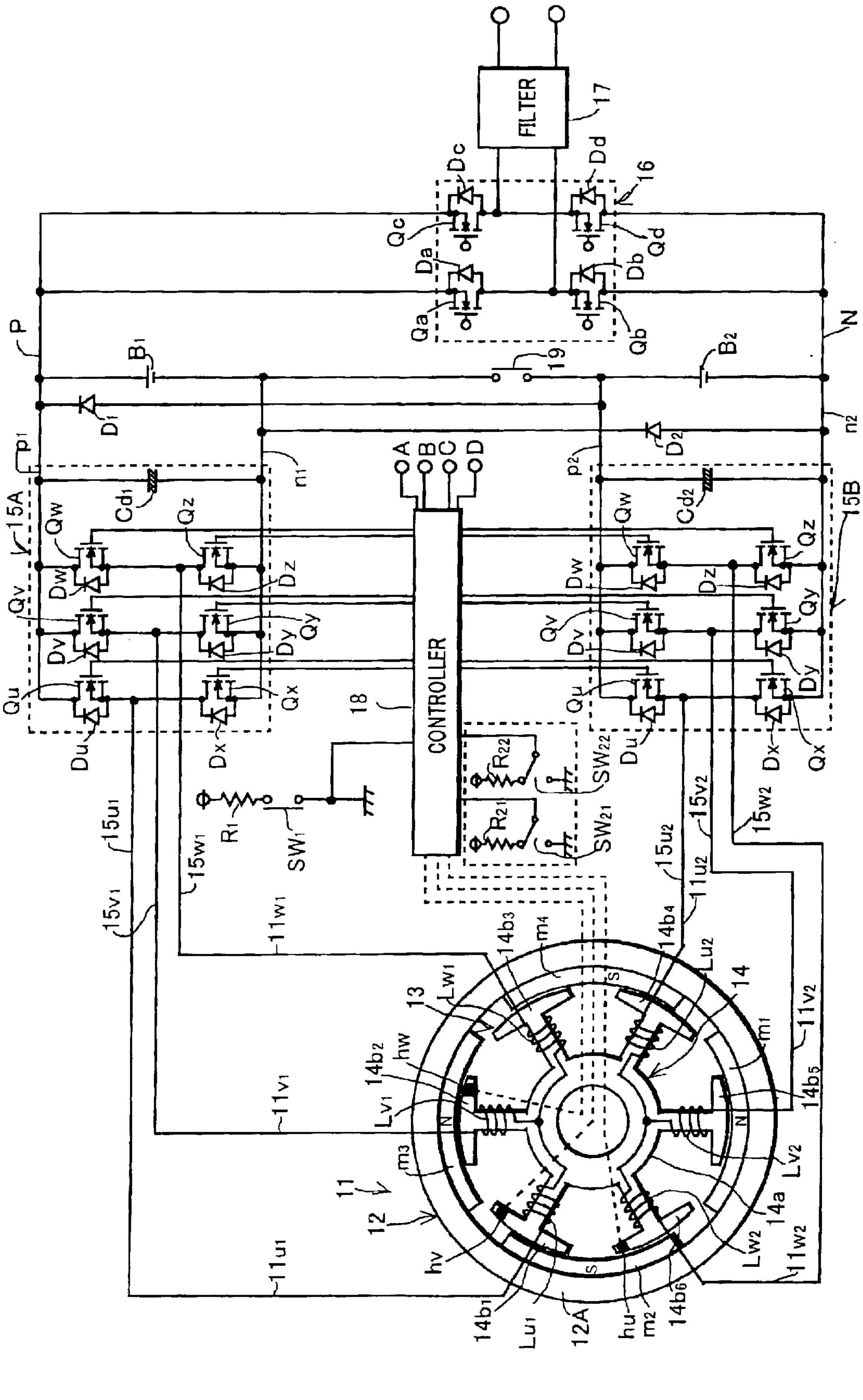
FIG. 3 is a schematic circuit diagram of a construction of another embodiment of the invention.

FIG. 3 shows another embodiment of the invention. In this embodiment, two switches SW21 and SW22 to which a DC voltage is applied from an unshown power supply through resistances R21, R22 are provided as voltage transfer instruction switches, and turning on/off the switches causes binary signals X and Y that take a value of "1" or "0" to be input to a controller 18. The controller 18 includes voltage instruction value determination means for determining a voltage value instructed by the voltage transfer instruction switch, from a combination of the values of the signals. The voltage instruction value determination means determines which of the following values: 100 V, 120 V, 230 V, and 240 V, the rated value of the output voltage of the inverter 16 instructed by the voltage transfer instruction switch is, from the combination of the values of the signals X, Y, for example, according to a truth table in FIG. 4. Then, the voltage instruction value determination means determines whether the series-parallel transfer switch 19 is to be turned on or turned off based on the determination results. Other constructions of the starter generator in FIG. 3 are the same as in the embodiment in FIG. 1.

Figures 4, 5:
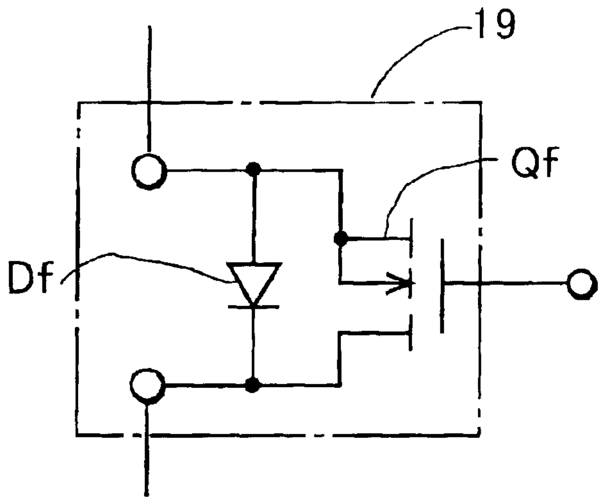
FIG. 4 is a truth table used when a controller determines a voltage instruction value in the embodiment of FIG. 3.
FIG. 5 is a schematic circuit diagram of a variation of a series-parallel transfer switch used in the embodiments of FIGS. 1 and 3.

In the above described embodiments, the relay contact is used as the series-parallel transfer switch 19, but as shown in FIG. 5, the series-parallel transfer switch 19 may be constituted by a semiconductor switch. In the example in FIG. 5, the series-parallel transfer switch 19 is constituted by a MOSFETQf having a parasitic diode Df formed between drain and source.

In the above described embodiments, the series-parallel transfer switch 19 is controlled according to the voltage transfer instruction, but the series-parallel transfer switch 19 may be manually operated.

In the above described embodiments, the series-parallel transfer switch 19 is connected between the negative terminal of the battery B1 and the positive terminal of the battery B2. Alternatively, without such a transfer switch, if it is previously learned that a commercial power supply in a shipment destination is from a 100 V system, the battery B1 and the battery B2 may be connected in parallel without connecting the negative terminal of the battery B1 and the positive terminal of the battery B2 at the time of shipment from a factory, and if it is previously learned that a commercial power supply in a shipment destination is from a 200 V system, the battery B1 and the battery B2 may be connected in series by connecting the negative terminal of the battery B1 and the positive terminal of the battery B2 with wiring at the time of shipment from the factory.

As described above, according to the invention, the stator has the first armature coil and the second armature coil, and the first battery and the second battery charged with the rectified outputs of the armature coils, and when the starter generator is operated as the generator, the first battery and the second battery, connected in series or in parallel according to the effective value of the AC voltage output from the inverter, are connected between the input terminals of the inverter. Thus, the maximum output required for the armature coil may be equal to the rated output of the inverter in both the case where the 100 V system voltage is output and the case where the 200 V system voltage is output. Therefore, the starter generator that can generate the 100 V system voltage and the 200 V system voltage can be obtained without increasing the sizes of the armature core and the armature coils more than necessary.

In the above described embodiment, the three-phase armature coil is used as the first armature coil and the second armature coil, but generally, an n-phase armature coil (n is an integer equal to or more than 3) can be used as the first armature coil and the second armature coil. As the rectifier circuit and the switch circuit that constitute the first driver and the second driver, an n-phase bridge type rectifier circuit and an n-phase switch circuit may be used so as to match the number of phases of the armature coil.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A starter generator for an internal combustion engine that operates as an electric motor for starting said internal combustion engine when said internal combustion engine is started, and operates as a generator after said internal combustion engine is started, comprising:

a magnet rotor mounted to a crankshaft of said internal combustion engine;

a stator having a polyphase first armature coil and a polyphase second armature coil;

a first battery and a second battery;

a first driver provided between said first armature coil and said first battery, and a second driver provided between said second armature coil and said second battery;

an inverter that converts a voltage of said first battery and a voltage of said second battery into an AC voltage; and a controller that controls said first driver, said second driver, and said inverter, wherein each driver includes: a polyphase rectifier circuit that is constituted by a bridge circuit of diodes, and rectifies an AC voltage induced in the corresponding armature coil to supply the AC voltage to the corresponding battery; and a polyphase switch circuit that is constituted by a bridge circuit of switch elements, each switch element being connected in anti-parallel to the corresponding diode that forms said polyphase rectifier circuit, said controller includes: a driver control unit that flows drive currents to said first armature coil and said second armature coil from said first battery and said second battery through the polyphase switch circuits in said first driver and said second driver, respectively, so as to rotate said magnet rotor in a direction of starting said internal combustion engine, when said internal combustion engine is started, and controls the polyphase switch circuits in said first driver and said second driver so as to keep, at a value equal to or less than a set value, DC voltages supplied to said first battery and said second battery from said first armature coil and said second armature coil through the polyphase rectifier circuits in said first driver and said second driver, after said internal combustion engine is started; and an inverter control unit that controls said inverter so as to output an AC voltage at a desired frequency from said inverter, and said first battery and said second battery are connected in series or in parallel according to an effective value of the AC voltage output from said inverter and are connected between DC input terminals of said inverter.

2. A starter generator for an internal combustion engine that operates as an electric motor for starting said internal combustion engine when said internal combustion engine is started, and operates as a generator after said internal combustion engine is started, comprising:

a magnet rotor mounted to a crankshaft of said internal combustion engine;

a stator having an n-phase first armature coil and an n-phase second armature coil (n is an integer equal to or more than 3) wound around an armature core with magnetic pole portions facing magnetic poles of said magnet rotor;

a first driver including an n-phase rectifier circuit that is constituted by a bride circuit of diodes, an n-phase switch circuit that is constituted by a bridge circuit of switch elements, each switch element being connected in anti-parallel to the corresponding diode that forms said n-phase rectifier circuit, n-phase AC terminals drawn in common from said n-phase rectifier circuit and said n-phase switch circuit, and a pair of DC terminals drawn in common from said n-phase rectifier circuit and said n-phase switch circuit, said n-phase AC terminals being connected to n-phase terminals of said first armature coil;

a second driver having the same construction as said first driver, n-phase AC terminals being connected to n-phase AC terminals of said second driver of said second armature coil;

a first battery connected between the DC terminals of said first driver, and a second battery connected between the DC terminals of said second driver;

an inverter having DC input terminals to which output voltages of said first battery and said second battery are input; and a controller that controls said first driver, said second driver, and said inverter, wherein said controller includes: a driver control unit that flows currents to said first armature coil and said second armature coil from said first battery and said second battery through the switch circuits in said first driver and said second driver, respectively, so as to rotate said magnet rotor in a direction of starting said internal combustion engine, when the internal combustion engine is started, and controls the switch circuits in said first driver and said second driver, so as to keep, at a value equal to or less than a set value, DC voltages supplied to said first battery and said second battery from said first armature coil and said second armature coil through the rectifier circuits in said first driver and said second driver, after said internal combustion engine is started; and an inverter control unit that controls said inverter so as to output an AC voltage at a commercial frequency from said inverter, and said first battery and said second battery are connected in series or in parallel according to an effective value of the AC voltage output from said inverter and are connected between DC input terminals of said inverter.

3. A starter generator for an internal combustion engine that operates as an electric motor for starting said internal combustion engine when said internal combustion engine is started, and operates as a generator after said internal combustion engine is started, comprising:

a magnet rotor mounted to a crankshaft of said internal combustion engine;

a stator having an n-phase first armature coil and an n-phase second armature coil (n is an integer equal to or more than 3) wound around an armature core with magnetic pole portions facing magnetic poles of said magnet rotor;

a first driver including an n-phase diode bridge full-wave rectifier circuit, an n-phase bridge type switch circuit that is constituted by a bridge circuit of switch elements, each switch element being connected in anti-parallel to the corresponding diode that forms said n-phase rectifier circuit, respectively, n-phase AC terminals drawn in common from said rectifier circuit and said switch circuit, and a pair of DC terminals drawn in common from said rectifier circuit and said switch circuit, said n-phase AC terminals being connected to n-phase terminals of said first armature coil;

a second driver having the same construction as said first driver, n-phase AC terminals of said second driver being connected to n-phase terminals of said second armature coil;

a first battery connected between the DC terminals of said first driver, and a second battery connected between DC terminals of said second driver;

a first diode having a cathode and an anode connected to a positive terminal of said first battery and a positive terminal of said second battery, respectively;

a second diode having a cathode and an anode connected to a negative terminal of said first battery and a negative terminal of said second battery, respectively;

an inverter having a positive DC input terminal and a negative DC input terminal connected to the positive terminal of said first battery and the negative terminal of said second battery, respectively; and a controller that controls said first driver, said second driver, and said inverter, wherein said controller includes: driver control means for flowing currents to said first armature coil and said second armature coil from said first battery and said second battery through the switch circuits in said first driver and said second driver, respectively, so as to rotate said magnet rotor in a direction of starting said internal combustion engine, when the internal combustion engine is started, and controlling the switch circuits in said first driver and said second driver so as to keep, at a value equal to or less than a set value, DC voltages supplied to said first battery and said second battery from said first armature coil and said second armature coil through the rectifier circuits in said first driver and said second driver, after said internal combustion engine is started; and inverter control means for controlling said inverter so as to output an AC voltage at a commercial frequency from said inverter, and the negative terminal of said first battery and the positive terminal of said second battery are connected or disconnected to transfer between a state where said first battery and said second battery are connected in series and a state where the both batteries are connected in parallel.

4. The starter generator for an internal combustion engine according to claim 3, wherein a series-parallel transfer switch is connected between the negative terminal of said first battery and the positive terminal of said second battery.

* * * * *